US012664625B1

(12) United States Patent
Rauen

(10) Patent No.: US 12,664,625 B1
(45) Date of Patent: Jun. 23, 2026

(54) MULTI-DIRECTIONAL NON-LINEAR STRETCH OF VIDEO

(71) Applicant: madVR Holdings, LLC, Rockville, MD (US)

(72) Inventor: Mathias Rauen, Hamburg (DE)

(73) Assignee: madVR Holdings, LLC, Rockville, MD (US)

( * ) Notice: Subject to any disclaimer, the term of this patent is extended or adjusted under 35 U.S.C. 154(b) by 181 days.

(21) Appl. No.: 18/463,554

(22) Filed: Sep. 8, 2023

Related U.S. Application Data

(60) Provisional application No. 63/374,970, filed on Sep. 8, 2022.

(51) Int. Cl.
| | |
|---|---|
| *G06T 3/40* | (2024.01) |
| *G06T 5/50* | (2006.01) |
| *G06T 5/80* | (2024.01) |
| *G06T 11/60* | (2026.01) |
| *G06V 20/40* | (2022.01) |
| *G06V 20/62* | (2022.01) |
| *H04N 7/01* | (2006.01) |

(52) U.S. Cl.
CPC .................. *G06T 5/80* (2024.01); *G06T 3/40* (2013.01); *G06T 5/50* (2013.01); *G06T 11/60* (2013.01); *G06V 20/49* (2022.01); *G06V 20/635* (2022.01); *H04N 7/0122* (2013.01); *G06T 2207/10016* (2013.01)

(58) Field of Classification Search
CPC ... G06T 11/60; G06T 5/80; G06T 5/50; G06T 3/40; G06T 2207/10016; G06V 20/635; G06V 20/49; H04N 7/0122
See application file for complete search history.

(56) References Cited

U.S. PATENT DOCUMENTS

| | | | | |
|---|---|---|---|---|
| 5,805,153 A | * | 9/1998 | Nielsen | H04N 21/6581 348/553 |
| 8,682,101 B1 | * | 3/2014 | Sahu | G06T 3/053 348/581 |
| 10,109,037 B1 | * | 10/2018 | Huang | H04N 23/843 |
| 2009/0162036 A1 | * | 6/2009 | Fujii | H04N 5/85 386/E5.068 |
| 2011/0109797 A1 | * | 5/2011 | Dunton | H04N 21/4312 348/E7.001 |
| 2011/0200092 A1 | * | 8/2011 | Todoroki | H04N 21/47 375/E7.026 |
| 2014/0023293 A1 | * | 1/2014 | Liang | G06T 1/00 382/298 |
| 2018/0054660 A1 | * | 2/2018 | Hwang | H04N 21/235 |
| 2022/0182558 A1 | * | 6/2022 | Boyd | G06F 3/165 |
| 2022/0210508 A1 | * | 6/2022 | Shao | H04N 21/4314 |
| 2023/0205939 A1 | * | 6/2023 | Fallows | G06F 30/12 703/1 |

* cited by examiner

*Primary Examiner* — Phi Hoang
(74) *Attorney, Agent, or Firm* — Schwegman, Lundberg & Woessner, P.A.

(57) ABSTRACT

Combinations of non-linear stretch expansion and compression in the vertical and horizontal directions are used to display images in a first aspect ratio on a screen having a second aspect ratio that is different than the first aspect ratio, utilizing the full extent of the screen if desired. Areas for display of subtitles may also be added. The use of such combinations can greatly reduce the distortion of the images perceived by viewers.

21 Claims, 8 Drawing Sheets

700

THIS IS AN EXAMPLE SUBTITLE IN THE MOVIE

725

730

710

720

100

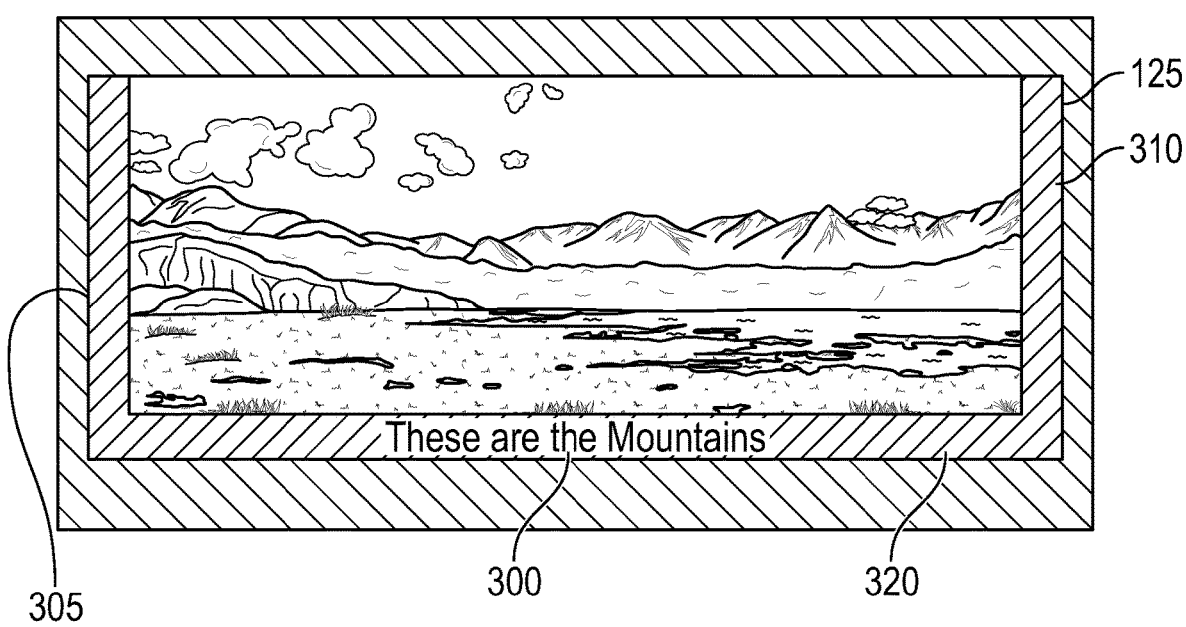

| ⚙ | ◁ Black Bars Configuration ▷ | |
|---|---|---|
| Black Bar Detection Speed | ◁ Ludicrous | BASE |
| Detect Kaleidescape Menu | ◁ On | BASE |
| Small Black Bar Reduction | ◁ 100% | BASE |
| Large Black Bar Reduction | ◁ None | BASE |
| If Black Bars Change... | ◁ Adjust At Once | BASE |
| ... Quickly Back & Forth | ◁ Adjust At Once | BASE |
| Subtitle Handling | ◁ Show Subtitles +1% Padding | BASE |
| Top Zoom Stickiness | ◁ 5 Seconds | BASE |
| Bottom Zoom Stickiness | 15 Seconds | BASE ▷ |

◁ Active Configuration ▷

MULTI-DIRECTIONAL NON-LINEAR STRETCH OF VIDEO

RELATED APPLICATION

This application claims priority to U.S. Provisional Application Ser. No. 63/374,970 (entitled Multi-Directional Non-Linear Stretch of Video, filed Sep. 8, 2022) which is incorporated herein by reference.

BACKGROUND

The aspect ratio of an image or video images is the ratio of its width to its height, and is sometimes expressed with two numbers separated by a colon, such as 16:9, or as a decimal, such as 1.77. For a given x:y aspect ratio, the image is x units wide and y units high. Likewise, for a given decimal expression it is the width divided by the height, e.g. expressed 1.77 for 16:9. Common aspect ratios are 1.33:1, 1.85:1, 2.0:1, 2.2:1, 2.35:1, 2.39:1, 2.40:1, 2.66:1, although technically speaking any aspect ratio is possible. Video source data may come with many different aspect ratios. A "scope" aspect ratio is a term that generally refers to an aspect ratio greater than the HDTV standard of 1.77:1. For example, a movie with an aspect ratio of 2.35:1 or higher is often referred to being scope content. Additionally, movie screens, as well as displays, such as video walls, projectors, and flat panels TVs and video monitors also are available in various aspect ratio panels, some of which are scope. For example, a movie screen that is 2.40:1 may be referred to as a scope screen, and a display that has a native aspect ratio of 2.35:1 may be referred to as having a scope aspect ratio.

When trying to display such images, including video images on display device screens that have a different ratio of width to height, images may be modified to fit the screen. Some example modifications include maintaining the ratio of the video to fit either the width or height of the screen and inserting blank areas as filler on sides of the screen that are too wide. The filler can be in the form of black bars, or a colored bar, or even blurred portions of the original image.

Another example of displaying video on screens having a different aspect ratio is to perform a stretch of the images in the dimension that does not fill the screen. The stretch may be linear, meaning that if the image is not as wide as the screen, the image is stretched the same across the width of the image to fit the width of the screen. Either vertical or horizontal stretching may be used. This can result in a visually disturbing distortion of the image.

Some have tried to reduce the distortion caused by linear stretching by performing a non-linear stretch of the image. A non-linear stretch may leave a center portion of the image appear unstretched, and then in the case of widening the image, only the sides of the image appear more stretched to fit a wider screen. This also can result in disturbing distortions.

SUMMARY

Combinations of non-linear stretch expansion and compression in the vertical and horizontal directions are used to display images in a first aspect ratio on a screen having a second aspect ratio that is different than the first aspect ratio, utilizing the full extent of the screen if desired. Areas for display of subtitles may also be added. The use of such combinations can greatly reduce the distortion of the images perceived by viewers.

BRIEF DESCRIPTION OF THE DRAWINGS

FIG. 3 is a view of a movie projected on a screen where the system provides subtitles while still maintaining an immersive viewing experience according to an example embodiment.

FIG. 4A is an example menu for facilitating selection of "stickiness" settings according to an example embodiment.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Non-linear stretching of images, including video images may apply either a vertical or horizontal function to pixels of the image to change an aspect ratio of the images. A cubic or root function may be used to choose how much to stretch each pixel (pixels nearer to the edge are stretched more than pixels in the center). This cubic or root function defines the amount of stretching. The stretching/interpolation algo itself is a separate step which uses linear resampling to calculate the final output pixels.

The linear resampling step may also utilize methods to not lose sharpness. Such methods may utilize statistical math such as covariance to make sure that the sharpness/detail per pixel is not reduced by applying non-linear stretch (NLS).

A similar process may be used to compress the images in an orthogonal direction to the direction the image was stretched. For example, if an image is expanded in the horizontal direction, the image may also be compressed in the vertical direction.

Stretching all four image edges allows a horizontal plus vertical non-linear stretch approach to basically share the visual load between all four image edges. Such sharing allows trading off stretching all four image edges instead of for a much less strong stretching of two image edges, such as the horizontal image edges. The center section of the overall image may not be stretched at all. With prior horizontal stretch approaches, horizontal camera pans in video images suffer. By sharing the stretching load, horizontal camera pans suffer less, because the horizontal NLS strength may be lower.

Figure 1:
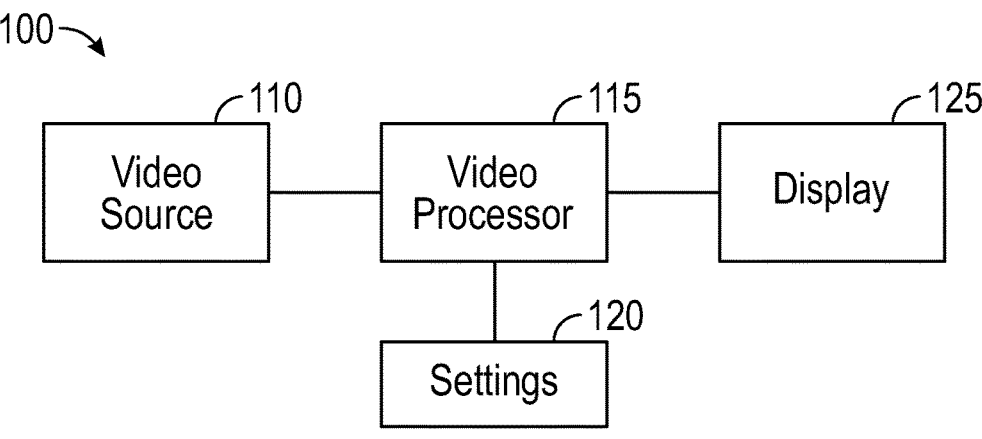
FIG. 1 is a block diagram illustrating an enhanced video processing system for modifying video images to optimize display of the images on a display device having a different aspect ratio than the original video according to an example embodiment.

FIG. 1 is a block diagram representation of an improved video processing system 100 may be used to improve placement of subtitles, perform a shared non-linear stretch approach, or both. Video from a video source 110 having a first aspect ratio is provided to a video processor 115 to perform the non-linear stretch. Alternatively, or in addition, processor 115 performs functions to improve the placement of subtitles based on settings 120. The video processor provides a video output to a display such as a screen 125 that may have a different aspect ratio than the video from the video source 110.

The shared non-linear stretch approach may be facilitated with the use of a visual setup assistant with built-in test images for many, such as fourteen, different commonly known movie aspect ratios, which allows a user (or installer/calibrator) to easily create custom non-linear stretch settings for each one of those movie aspect ratios. The aspect ratios of the images/video and the display screen may be detected by a video processing system automatically, and usually very quickly. The system will choose the right NLS preset to use for any given pair of aspect ratios. The addition of vertical NLS allows the system 100 to remove filler, such as black bars, for every combination of movie vs screen aspect ratio, without losing much, if any, image content. In various examples, a 16:9 movie may be multidimensionally stretched to a scope screen, a scope screen movie may be multidimensionally stretched to a 16:9 screen. A 2.76 movie may be multidimensionally stretched to a scope screen, etc. And for every movie aspect ratio, the system 100 may allow selection of whether to use horizontal non-linear stretching (either expansion or compression) or vertical non-linear stretching (either expansion or compression), or to combine both to share the load between all 4 image edges.

Figure 2:
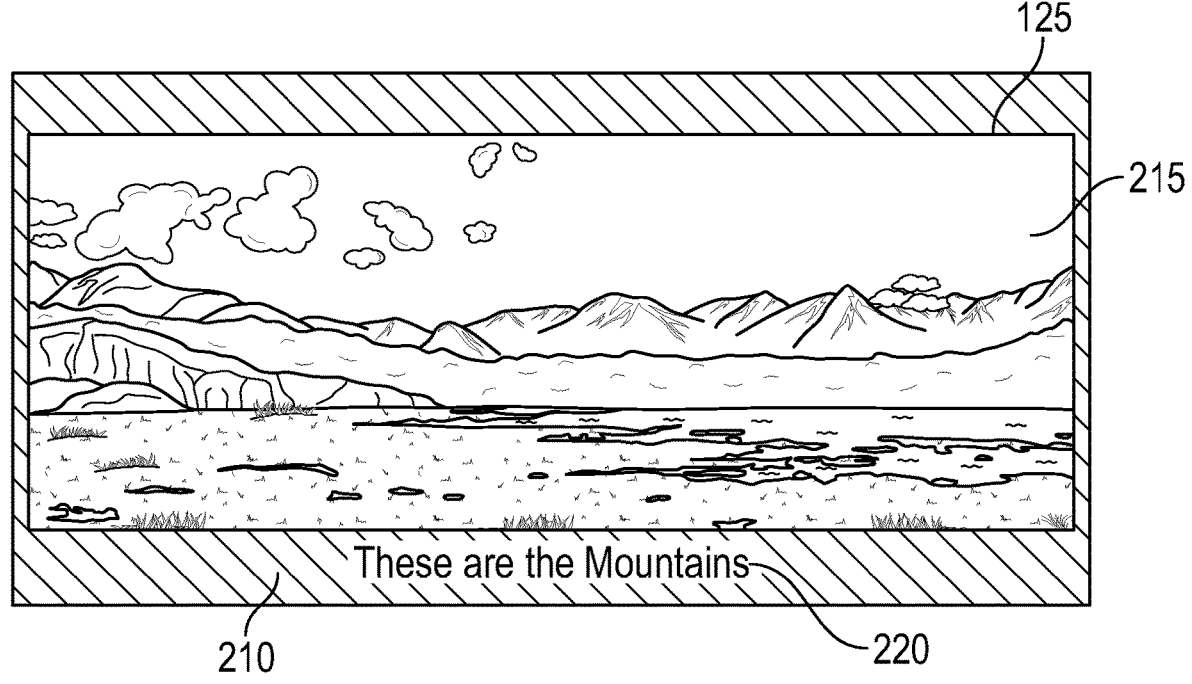
FIG. 2 is a view of a movie being projected onto a screen that is placed adjacent to a wall according to an example embodiment.

FIG. 2 is a view of a movie being projected onto the screen 125 that is placed adjacent to a wall 210. While zooming out an active area 215 of a movie and stretching it to fill the screen 125 can be done, prior methods of stretching often resulted in obscuring subtitles 220 or cause the subtitles to occur in undesired portions of a screen 125, or even off of the screen 125, and on the wall 210 in the case of a movie being projected on a screen in front of the wall as shown in FIG. 2. The subtitles 220 may not be readable when projected onto the wall.

While undesired placement of subtitles can be solved by not zooming the video out all the way to fill the screen 125, it can result boxing of the active area of the movie by the fill areas, such as black bars, creating a less immersive viewing experience.

FIG. 3 is a view of a movie projected on screen 125 where the system 100 provides subtitles 300 while still maintaining an immersive viewing experience. The video processing system 100 dynamically makes room for subtitles in real time as subtitles are detected and displayed. The system 100 ensures the maximum image size is available even while fitting in the subtitles.

To dynamically making room for subtitles, the system 100 modifies the shared stretching to include black bars needed to fit the subtitle 300 "These are the mountains" on the screen 125. In one example, the black bars include two laterally spaced bars 305 and 310, and one bottom black bar 320.

There is no black bar on top, which enables a viewer to enjoy the movie at the largest size possible, while still not missing any subtitles. The size of the black bar 320 may be selected to be large enough to clearly display a selected font size for the subtitles, and the side bar width selected to allow a maximum stretch given the size of the bottom black bar 320. After a viewer selectable preferred amount of time without subtitles passes, the system 100 may restore a full image to once again fill the screen 125, until the next scene when subtitles are detected and displayed.

Note that the term black bar need not imply that the bar is actually black. For purposes of displaying subtitles, it is desired that the black bar and text have different contrasting colors that enable viewing of the subtitles by a user/viewer of the content being displayed.

With the system 100 dynamically adjusting the image size based on the subtitles and their position, naturally the question comes to mind about how to ensure the image size isn't changing too often to be distracting. After all, there are many scenes where there are breaks between dialog, and one wouldn't want the image to keep changing its size each time a new subtitle appeared.

The system 100 enables the viewer to be in full control over how and when the image size is adjusted. If the viewer prefers to maximize the image size and does not mind the size changing more often, a short delay like 5 or 15 seconds may be selected. Otherwise, a good choice may be 45 seconds. Or the viewer does not want the image size to change at all once subtitles are detected, an "Until the end of the movie" option may be selected and the system 100 will keep the minimum black bars needed to fit the subtitles during the movie without going back to full size.

FIG. 4A is an example menu 400 for facilitating selection of "stickiness" settings.

Figure 4B:
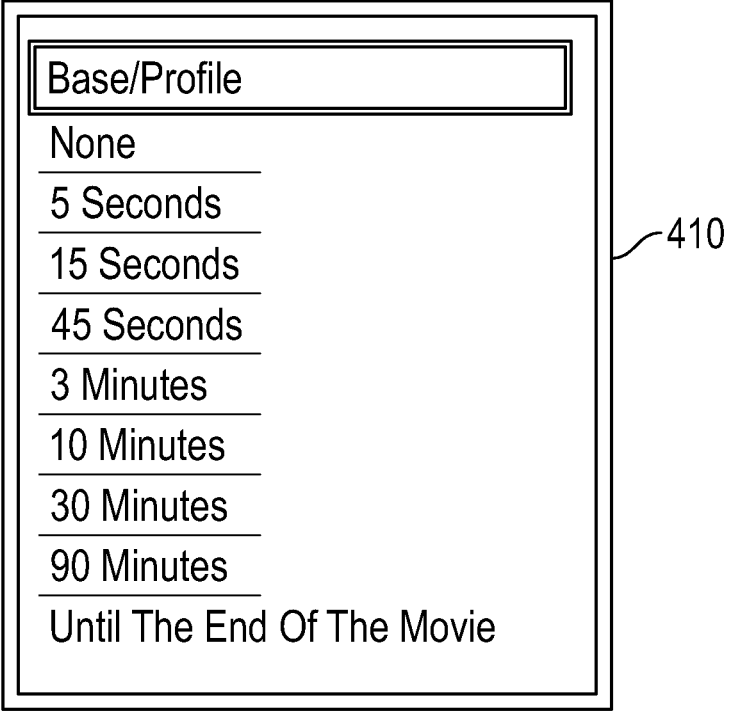
FIG. 4B is an example menu for selecting an amount of time to maintain the zoom level needed for display of subtitles referred to as a stickiness level according to an example embodiment.

FIG. 4B is an example menu 410 for selecting an amount of time to maintain the zoom level needed for display of subtitles referred to as a stickiness level. The zoom stickiness defines for how long the system 100 keeps the zoom to make subtitles visible. A longer delay helps keep the zoom setting stable if subtitles only appear once in a while. A shorter delay helps avoid sasting screen space long after subtitles have stopped appearing in the movie.

The system 100 automatically increases the size of the black bars to fit subtitles that are multi-line. For example, assume the first subtitle is one line. Then the next subtitle is two or three lines. The system 100 will instantly detect the change in the number of lines and increase the black bar area to fit all three lines of subtitles and hold that size for the duration set by the viewer.

In one example, raw pixel values are reviewed to determine how "big" or large the subtitles are. Whether it's actually 2 or 3 or 15 lines doesn't matter. The height in pixels of the subtitles is determined. The subtitle may alternatively be a picture instead of text. The size of the subtitle area is determined and used to calculate new scaling/shifting parameters to make sure that the subtitles are fully visible, without wasting any screen size.

Subtitles in a top bar may also be handled by the system 100. Non-linear stretch can be combined with subtitle management to remove the side bars present when subtitles appear. The system 100 treats subtitles in the top bar in the same way that subtitles in the bottom black bar are treated. The system 100 manages top and bottom black bars separately. For example, let's say a movie has two lines of subtitles in the bottom black bar. The system 100 makes room for these subtitles. Further, assume that while those subtitles are still being shown, a single subtitle line appears in the top bar. The system 100 will make room for that as well. While at the same time, minimizing the size of both black bars. Both top and bottom subtitles are treated independently yet also work concurrently, with separate "Stickiness" settings for each.

In one example that involves subtitles that appear both in the active image area and a black bar, the system detects that there are subtitle pixels in the active image area by analyzing the brightest pixel in the black bar. For subtitles, this is usually a very bright pixel, and it's usually white. So the color and brightness have been identified, the system searches the bottom part of the active image area to find pixels that have a similar color and brightness, which we then classify as subtitle pixels. Afterwards we have a new rectangle in which there are subtitles to be found. The rectangle can reach both into the black bar and into the active image area. Now the rectangle can be moved up, to move it completely into the active image area. However, if done in a simple way, some parts of the active image area may be moved up, which can look weird.

Aspect Ratio (AR) is the ratio between the measurement of an image's width and height, and characterizes the 'shape' of the image.

Consider the AR used to produce the video we want to watch. The first TV shows from decades ago had a 4:3 AR. This AR is only slightly wider than it is tall, giving it an almost 'square' type of shape. HDTV was the next big development. This format brought higher resolution, along with a 16:9 AR, which is significantly wider than tall, giving it a much more rectangular shape.

With a home theater setup with a movie screen, we need to consider the AR for both the projector and the movie screen. With modern projectors, the chip being used to create the image is generally 16:9, and sometimes 1.90:1 or even 2.37:1. Although screens can be ordered with any AR desired, 16:9, 2.35, 2.37 and 2.40 are most common these days.

Now consider that the projector is using one AR to generate the image, which is then displayed on a screen that likely has a different AR, and the movie will have its own AR, which may or may not match either the projector or screen! Obviously, this can get quite complicated, given the large the number of combinations of the different AR's of these 3 elements. But fortunately, the system 100 will seamlessly handle it all, and can be customized to one's individual preferences, as we'll see shortly.

Projector Screens can have any AR desired. In practice though, the vast majority of screens fall into 2 categories: 16:9, matching the HDTV standard for Television, and a 'Scope' screen used for most Movies, usually between 2.35:1 and 2.40:1. Each has strengths and weaknesses, and one might be more appropriate than the other, depending on what type of content is most important to a given person. In addition, there are physical constraints in the room's size and design that might cause one to lean towards one screen or the other.

If somebody will be using their system primarily for Sports and traditional TV, since 16:9 is the standard AR for this content, then having a screen with this same AR would be the most appropriate. There would be no Black Bars to worry about, the screen would be completely filled, and the Projector chip would be fully utilized, since the AR for all three is a perfect match.

In addition, the dimensions of some rooms, or the presence of doors, windows, etc., might make them more "width limited" than "height limited", such that installing a Scope screen is impractical. In this case, a 16:9 screen might represent an optimal use of the available wall space.

But the disadvantages of a 16:9 screen become evident when this setup is used to watch most movies (or any content having an AR wider than 16:9). The presentation of this wider content will result in having black Letterbox bars at the top and bottom of the screen. The wider the AR, the larger those bars will be.

The net result here is that instead of Movies providing a more immersive experience, with a larger image (which is the reason the film-makers utilized a wider AR to begin with), the image is now actually smaller because of the presence of the Letterbox bars, and is therefore less immersive. This may be an acceptable compromise if Sports and TV are more important to those using the system, and if they are less concerned about Movies not being viewed optimally. But this doesn't change the fact that for most Movies, viewing is compromised with a 16:9 screen.

If the Theater is being designed primarily for watching Movies, with Sports and regular TV a lesser concern, a Scope screen would be the most appropriate choice. Since the bulk of Movies have a wide AR (2.35:1 to 2.40:1), having a screen that matches this AR would provide the largest image, with the least compromise.

In an ideal situation, a person would first identify the largest 16:9 screen size they would want to have when watching Sports and regular TV. For most people, if the image gets too large vertically, it can become uncomfortable, so this limit needs to be established first. They would then choose a Scope screen that has the same height, and which provides the additional width. In this way, 16:9 content is exactly the size they want, and when watching Movies, they gain the extra width and immersiveness of the Scope screen, as the film-makers intended.

Figure 5A:
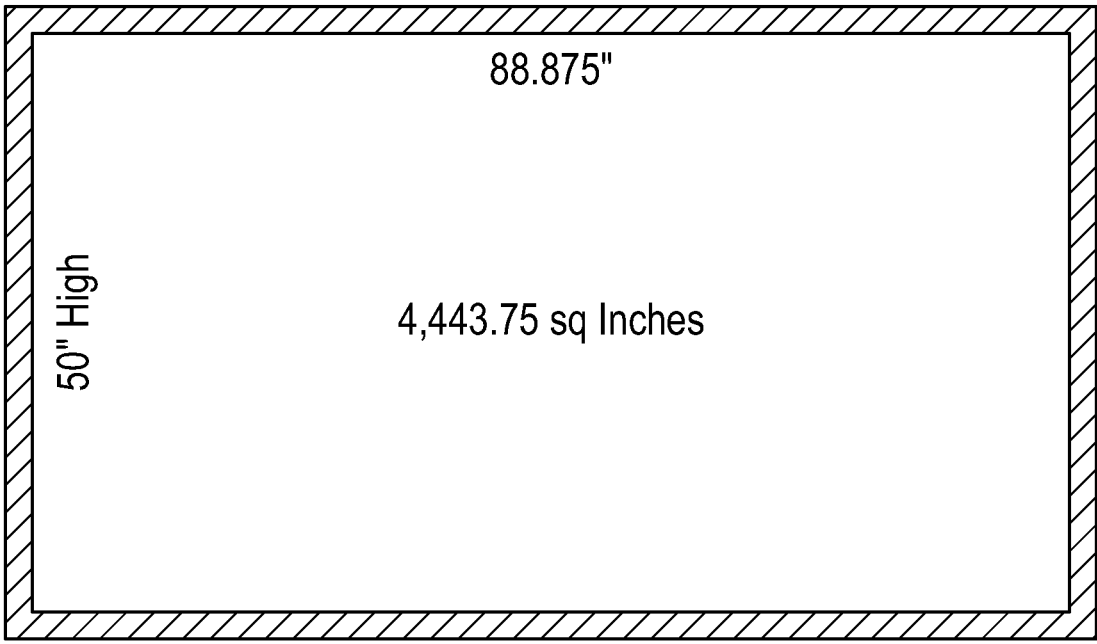
FIG. 5A illustrates a 16:9 Screen with 50" Height according to an example embodiment.
Figure 5B:
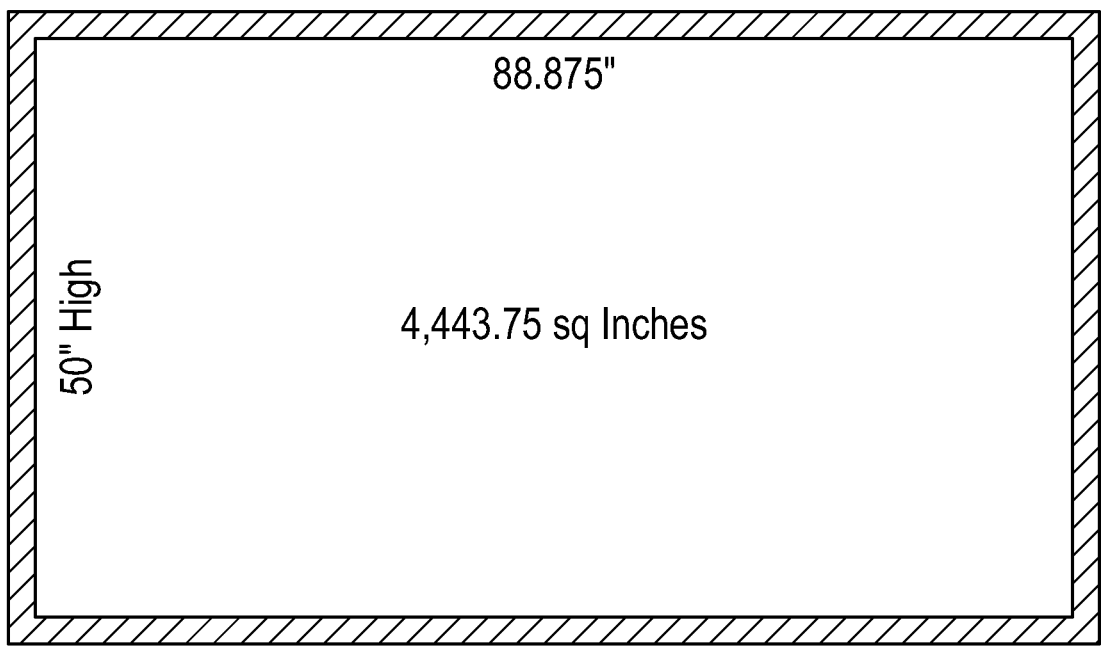
FIG. 5B illustrates a Scope Screen with a 50" height according to an example embodiment.

This can be illustrated in FIGS. 5A and 5B, using an example of two screens that have the same 50" Height. FIG. 5A illustrates a 16:9 Screen with 50" Height. FIG. 5B illustrates a Scope Screen with a 50" height.

Figure 5C:
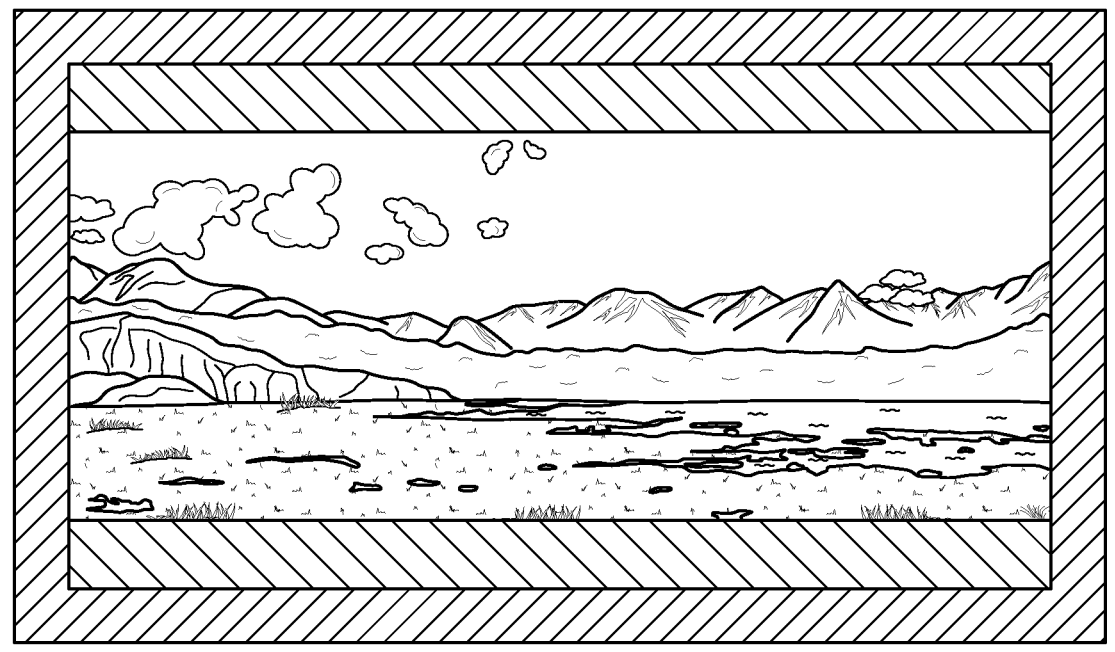
FIG. 5C illustrates a Scope movie viewed on a 50" High 16:9 Screen with large Letterbox Bars.
Figure 5D:
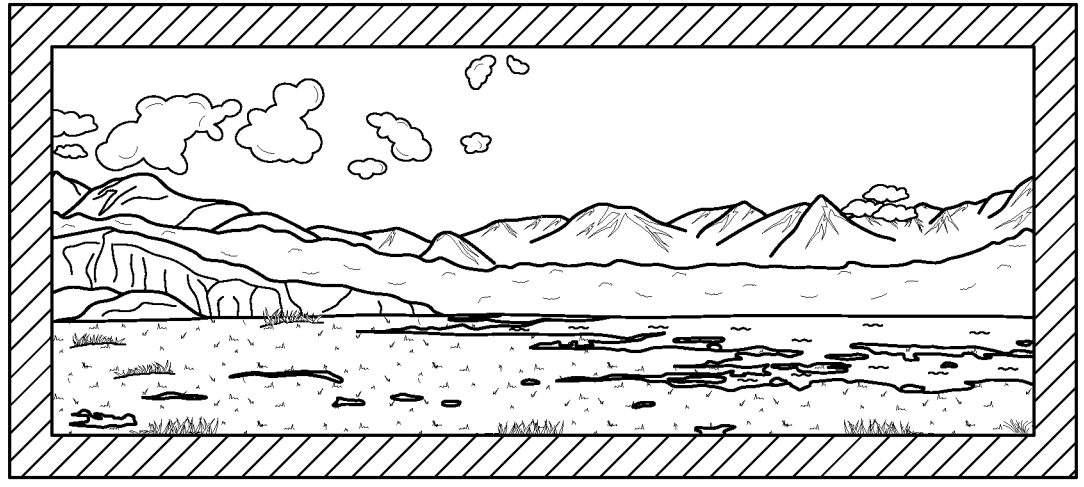
FIG. 5D illustrates a Scope Movie viewed on a 50" High Scope Screen, filling both the Height and Width.

The dramatic difference in visual impact between a 16:9 screen, and Scope screen of the same height, when watching a Scope movie is easily seen in these images. FIG. 5C illustrates a Scope movie viewed on a 50" High 16:9 Screen with large Letterbox Bars. FIG. 5D illustrates a Scope Movie viewed on a 50" High Scope Screen, filling both the Height and Width.

The dimensions and physical constraints of a given room may be such that this can't be achieved. As noted before, some rooms are more 'width-limited' than 'height-limited,' limiting one's options. And sometimes the Projector may not be able to provide the image size you need, at the available Throw Distance. But when this approach is possible, it provides the best of both worlds.

One of the most exciting aspects of having a Home Theater is being able to recreate the immersive "Big Screen" experience that we have enjoyed in commercial Movie theaters, but in the privacy of our own homes. As shown above, one of the best ways to accomplish this is by using a Scope screen. The rest of this document focuses on how the system 100 provides the tools to make full use of a Scope screen, to fully realize this experience.

As previously explained, with a Scope screen we have at least an approximate match in AR between the Movie itself, and the Screen. Remember, however, the chip in the Projector has a different AR (16:9 or 1.90:1), which doesn't match the AR of the Movie or the screen. We also have to account for content with "in-between" AR: 1.85:1, 2.00:1, 2.20:1, etc. These factors present significant obstacles to properly viewing all content on a Scope screen.

The video processing system rises to these challenges, and automatically optimizes the viewing of content with any aspect ratio on your Scope screen.

Content with AR wider than 16:9 is encoded in the source with black Letterbox bars on the top and bottom. The wider the AR, the taller these bars are, and the less of the available space is actually used for the content itself. This is true for broadcast video and streaming content, as well as Blu-ray and 4 k/UHD Blu-ray discs. The following sections present the usual ways of dealing with those pesky Black Bars:

Many Projectors offer the ability to "Zoom" the image with its Lens, making it larger or smaller, without changing the underlying AR. So by changing the amount of Zoom, the Black Bars can be moved outside the screen area where they're generally not seen, and the content then occupies the full height of the visible screen area. Some of these Projectors also include several "Lens Memory" slots, so you can display content with any AR, and this generally works fairly well.

If a 16:9 Screen was being used, the image would get progressively smaller as the AR widened. With a Scope screen, the image gets progressively larger as the AR widens, as intended by the movie director.

One major downside of this approach, however, is that the physical changes associated with Lens Zoom, Position, and Focus are typically not 100% precise, with some 'drift' over time, requiring periodic adjustment of these settings. It also takes a moderate amount of time for these changes to be made, sometimes as much as 15-30 seconds.

Also, with the Zoom Method, there is no practical way of dealing with shows or Movies where the AR changes during the show itself (this includes many Christopher Nolan Movies, WW84, The Expanse, and others). And more importantly, if you're watching a Scope Movie, with Zoom set accordingly, Menus and On Screen Display (OSD) elements which appear when using the Pause and Fast Forward/Reverse buttons, show up in the Black Bar area, on the screen frame and wall, which is a major problem. Even if you use the Projector to mask them out, the Menus still can't be properly seen or effectively used.

Despite all the complexity of various prior methods of attempting to adapt movie size to screen/display size, such a zoom, anamorphic lenses, vertical and horizontal compression lenses above, the improved video processing system is able to simply, elegantly, and automatically make adjustments for content of any and all Aspect Ratios.

In one example, the system examines the incoming video signal, and is able to recognize the presence, and size, of any Black Bars that are part of the signal. In this way, the system identifies the AR of the content itself, and scales it so that any Letterbox bars are eliminated, completely filling the height of the screen, regardless of the AR.

One exception may occur with the rare content created with AR wider than 2.40:1 (for example, the 1959 Movie Ben Hur was shot with an AR of 2.76:1). Because these are wider than the screen itself, there may be Letterbox bars present on the top and bottom, depending on how the system is configured.

If the content has a 16:9 AR, there are no Black Bars, the system can determine that it has to scale the image to fill the screen height, to prevent the Image from spilling over the top and bottom of the Screen. Because the 16:9 content is a different AR or 'shape' than the 2.40:1 screen, there are Pillarbox bars present on the sides, as there should be. But this 16:9 image is as large as it can be on the 2.40:1 screen.

When the incoming content is 2.40:1, the original video signal includes fairly tall Letterbox bars, as we've seen above. The system recognizes and eliminates those bars, and then scales the content so that it now fills the height and width of the screen.

With those pesky shows that have 'in-between' AR's (1.85:1, 2.00:1, 2.20:1, etc.) the only thing that changes is the size of the Letterbox bars. The system identifies the Letterbox bars and scales the output accordingly, resulting in optimal filling of the Scope screen, for any and all Aspect Ratios.

Similarly, at the beginning of the show, the Menus are typically encoded in 16:9 AR. There are no Black Bars, so the system may output these Menus in that original 16:9 AR, and the entire Menu with all its options are fully visible. If a user hits Pause during the show, other Menu items are generated-Scenes, Progress Bars and so forth. These are now in the Letterbox area which the system is monitoring, so it immediately rescales the output to make these options fully visible.

With 2.40:1 Content being played, when the user hits Pause, the system rescales its output so all Menu items are seen:

The user can then watch one of the shows that contains a variable AR, and once again the system automatically adjusts its scaling, so that the proper AR is shown, using the largest possible picture size.

The system also provides numerous options to 'fine-tune' handling of Black Bars. For example, if a 2.40:1 Movie is being displayed on a 2.40:1 screen, the Movie fills the full height and width of the screen, since the AR's are identical. If a 2.35:1 Movie is being displayed, the system again scales the Movie to fill the height of the screen, but since this AR is slightly less wide than a 2.40:1 Movie, of necessity, there are very narrow vertical bars on each side.

The vertical bars may or may not be visible, depending on the particulars of any given setup, but the system provides an option to completely eliminate these 'small' Black Bars if desired, so that the full width is once again filled. It does so by scaling the content, so that a sliver of the picture at the top and bottom are cropped, basically tweaking the 2.35:1 Movie to a 2.40:1 AR.

The system, in one example, provides the user control of the handling of the black bars, so the user can customize precisely how the system works to match with the user's personal preferences.

Many users choose to enable Subtitles for Movies and shows, and this can present significant problems for viewing on a Scope screen. In general, when the AR is narrower than 2.35:1, the Subtitles are present within the content itself, so no special problems exist. But for many 2.35:1 and wider Movies, the Subtitles will be present, either completely or partially within the black Letterbox bars. This will depend on the Movie, and the player being used, but this is a frequent problem.

When the player is sending out a 2.40:1 AR movie with Subtitles in use, the Subtitles can overlap the content and black bar area (sometimes they can be entirely within the bars).

The net result of using prior methods to resize the content and arrange the subtitles, is that either the image size is dramatically reduced, or the Subtitles are cut off, with neither option being desirable.

The improved system 100 uses the Black Bar detection ability to recognize the presence of Subtitles in both the bottom and top Black Bars, and scales the content just enough to make them visible, while keeping the image size as large as possible. In addition, the end user is given several options to fine-tune the system to customize its performance for their preferences.

Figure 6:
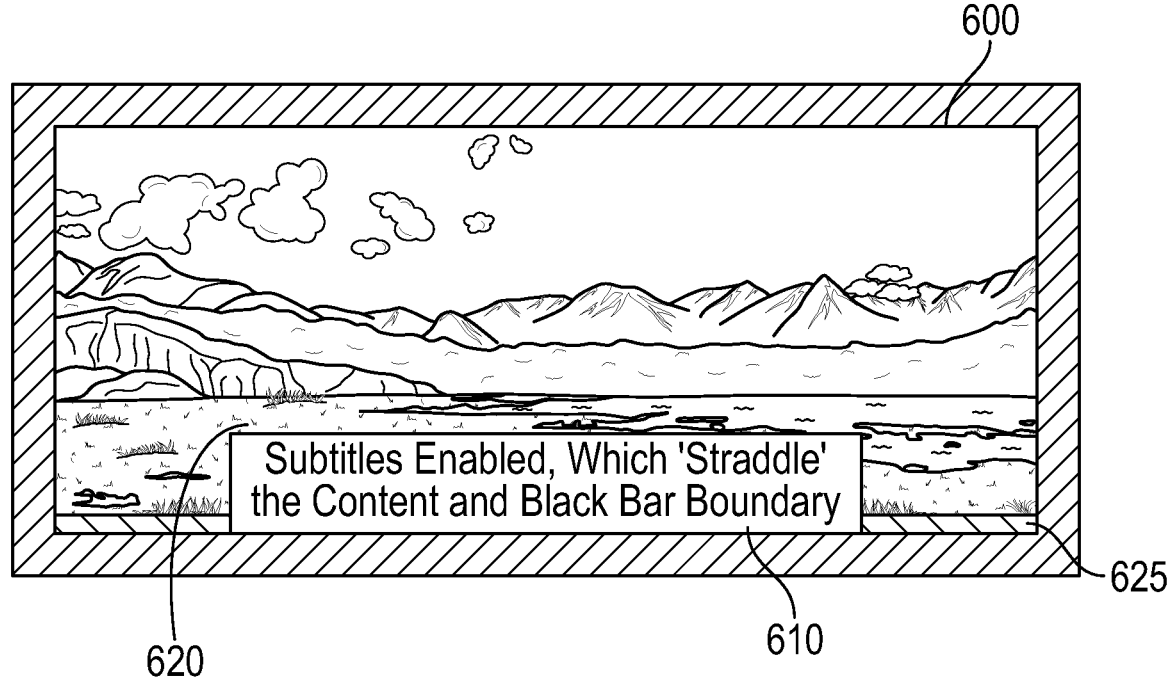
FIG. 6 shows a view of a movie frame with subtitles enabled according to an example embodiment.

Using the system 100 with its options for Subtitles and Black Bar reduction, an ideal result can be achieved. FIG. 6 shows a view of a movie frame 600 with subtitles 610 enabled. The subtitle 610 is shown within a subtitle area 620 which straddles the content frame 600 and a black bar boundary 625.

The amount of space allotted for the Subtitle area 620 can be adjusted, providing the ability to optimize their appearance for user's own Theater or display device. Similarly, the duration for how long the AR adjustment for Subtitles will remain in place can be customized, for both top and bottom Subtitles individually. Some might prefer a constant AR to be used throughout, while others might want the AR adjusted only when Subtitles are present. The system provides these and other choices to control Subtitle treatment.

Briefly stated, the system provides the ability to maximize the image size, while still including Subtitles, providing the best of both worlds. And it bears repeating that this is accomplished automatically, with no button pushes or other action needed.

The video processing system dynamically makes room for embedded subtitles in real-time as they appear, while also ensuring the maximum image size is always available, even while still fitting the subtitles.

Figure 7:
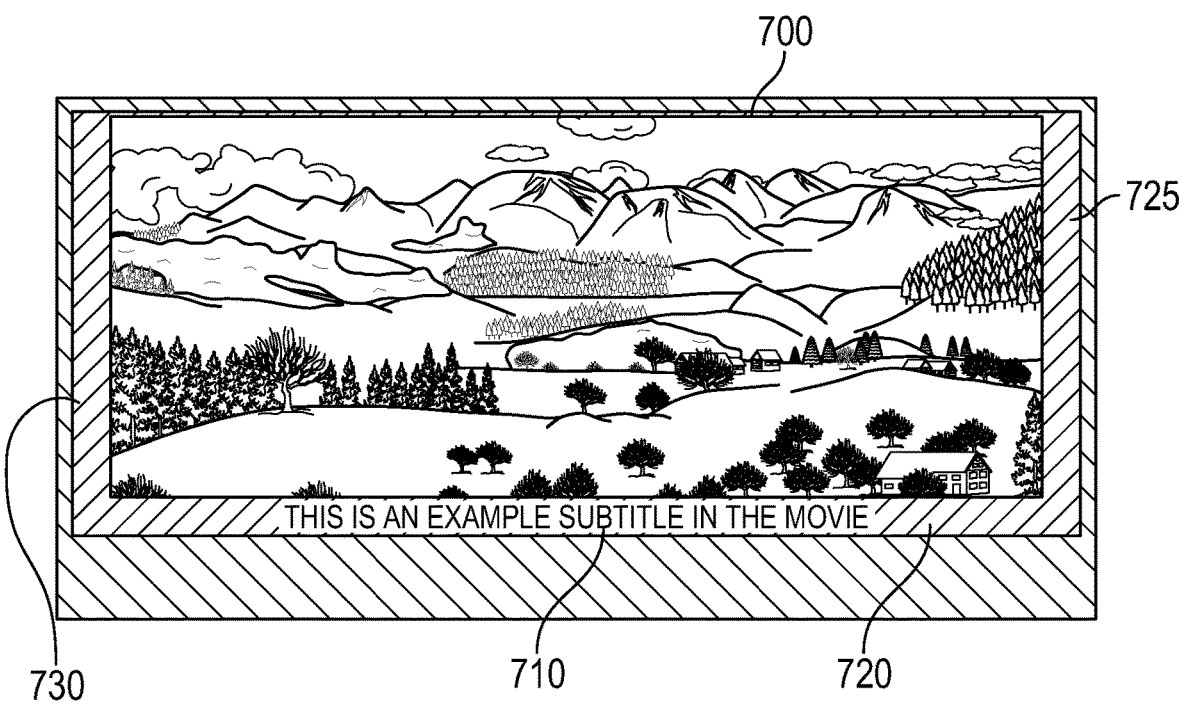
FIG. 7 shows a view of a movie frame with a subtitle shown within a subtitle area comprising a bottom black bar according to an example embodiment.

FIG. 7 shows a view of a movie frame 700 with subtitles 710 enabled. The subtitle 710 is shown within a subtitle area 720, comprising a bottom black bar. The movie size is maximized, with the bottom black bar, subtitle area 720, sized just large enough to fit the subtitle 710. Movie frame 700 includes side black bars 725 and 730.

Notice in the image how the system 100 brought back just enough of the black bars needed to fit the subtitles on the screen. Notice too that there is also no black bar on top. This enables the user to enjoy the movie at a much larger size, while still not missing any subtitles. After a preferred amount of time without subtitles passes, the system may restore the full 2.40 image so it fills the screen again, until the next scene when subtitles reappear.

In one example, the system features a next-generation improved non-linear stretch (NLS). NLS can remove black bars by very carefully stretching the image to fill the screen, regardless of the screen and movie aspect ratios. NLS can be combined with subtitle management so that the black bars needed to hold subtitles are dynamically brought back on the screen, while also filling the screen horizontally, with no black bars on the side.

Figure 8:
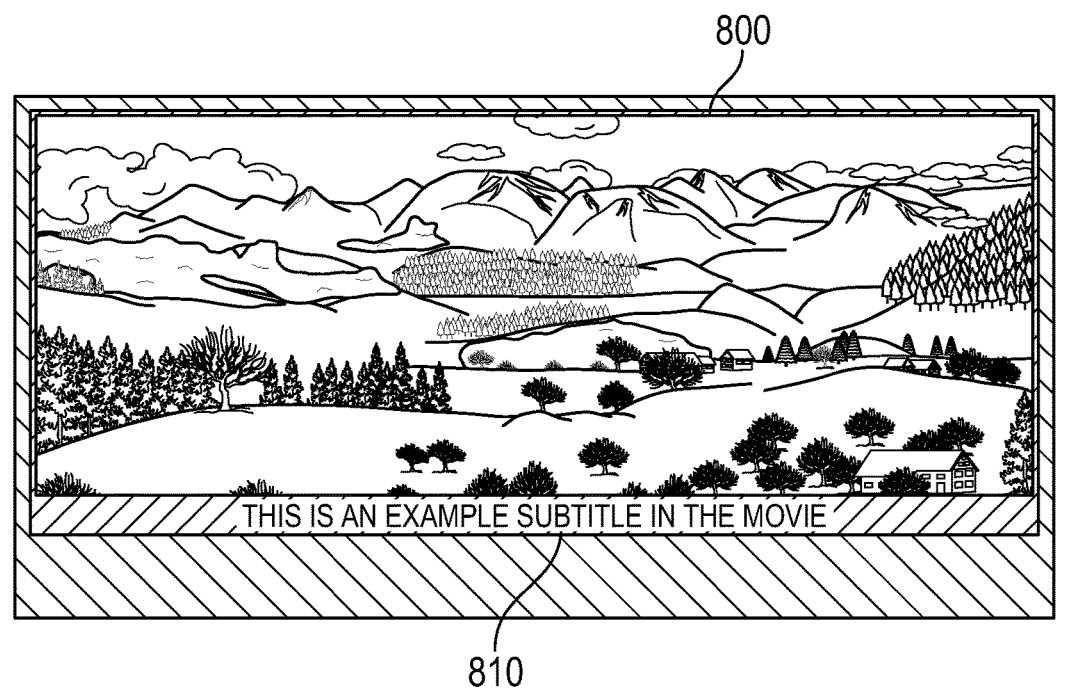
FIG. 8 shows a view of a movie frame with non-linear stretch operating in conjunction with improved subtitle placement that removes side bars according to an example embodiment.

FIG. 8 shows a view of a movie frame 800 with NLS operating in conjunction with improved subtitle 810 placement that removes the side bars seen in FIG. 7.

With the system dynamically adjusting the image size based on the subtitles and their position, the system can ensure the image size is not changing too often to be a distraction. Often there are scenes where there are breaks between dialog. It can be distracting if the system were to keep changing image sizes as subtitles appear and disappear.

User options are provided in one example to define how and when the system adjusts the image size to fit subtitles. In one example, the user may prefer to maximize the image size regardless of the frequency of image size changing. This may be done by picking a short "Stickiness" setting, like 5 or 15 seconds as shown in FIGS. 4A and 4B. Otherwise, an excellent choice is 45 seconds. Or if the user does not want the image size to change at all once subtitles are first detected, "Until the end of the movie", may be selected and the system will keep the minimum black bars needed to fit the subtitles during the movie, without going back to full size.

In one example, the system automatically increases the size of the black bars to fit subtitles that are multi-line. For example, assume the first subtitle is one line. Then the next subtitle is two or three lines. The system will increase the black bar area to fit all three lines of subtitle text and hold that size for the duration as set by the current "Stickiness" setting.

Subtitles in the top bar to consider may be treated in the same way as subtitles in the bottom black bar. The system can manage top and bottom black bars independently.

In one example, a movie may have two lines of subtitles in the bottom black bar. The system makes room for these subtitles as described above. While the bottom black bar subtitles are still shown, a single subtitle line appears in the top bar. The system will make room for the top bar subtitle independently of the bottom black bar subtitles, whether single line or multiple line subtitles. This subtitle black bar management can be done at the same time as minimizing the size of both black bars. Both top and bottom subtitles are treated independently, yet also work concurrently, with separate "Stickiness" settings for each.

The system increases the level of immersion by maximizing the image size of scope movies with subtitles. The system can bring the black bars back on the screen only as needed to see the subtitles Both top and bottom subtitles are treated independently yet work together.

Figure 9:
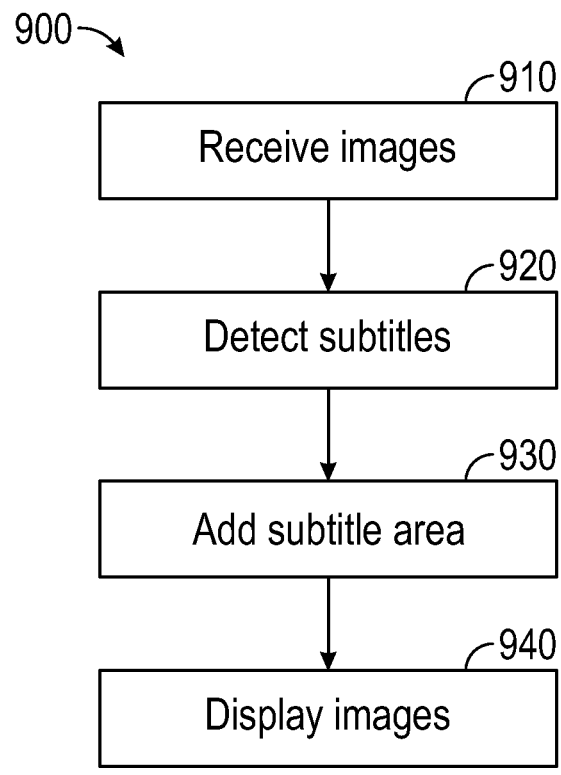
FIG. 9 is a flowchart illustrating a computer implemented method of adding a subtitle area to video images according to an example embodiment.

FIG. 9 is a flowchart illustrating a computer implemented method 900 of adding a subtitle area to video images. Method 900 begins at operation 910 by receiving video images having a first aspect ratio. Operation 920 detects subtitles in the received video images. Operation 930 adds a subtitle area for display at operation 940 of subtitles outside of the display of the video images by modifying the size of the displayed video images. The subtitle area may include a black bar area having a size that is minimized to fit the detected subtitle while using the nonlinear stretch to reduce or remove black bar areas that do not contain subtitles.

In one example, the displayed video images are displayed on a display device having a second aspect ratio different than the first aspect ratio. Modifying the size of the displayed video images may include performing a nonlinear stretch to both horizontal and vertical aspects of the received video images as a function of the first and second aspect ratios to optimize display of the video images on the display device.

The nonlinear stretch may be performed by expanding the video images in one of the horizontal and vertical directions and compressing the video image in the other one of the horizontal and vertical directions.

In one example, performing a nonlinear stretch comprises comparing the first and second aspect ratios to a table of aspect ratios and selecting parameters from the table for the expanding and compressing.

In one example, the subtitle area is removed after a configurable amount of time since detecting at least one subtitle.

Figure 10:
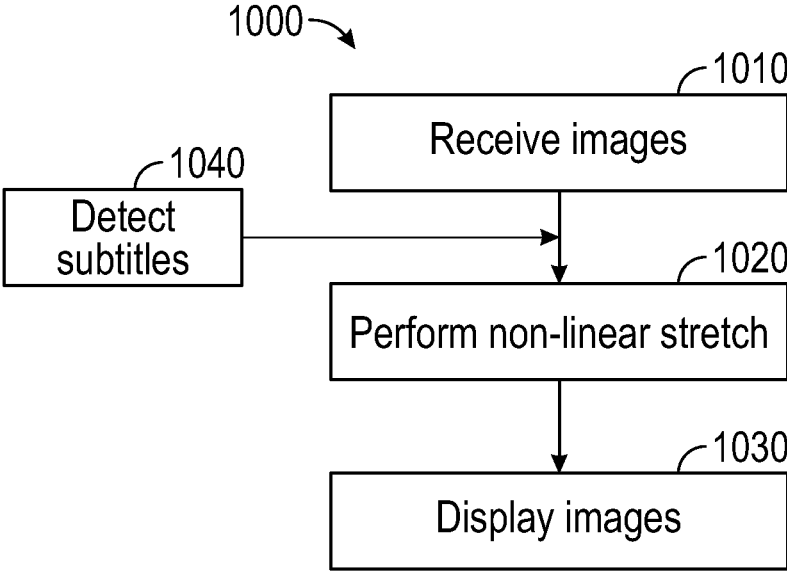
FIG. 10 is a flowchart illustrating a computer implemented method of performing non-linear stretch on images according to an example embodiment.

FIG. 10 is a flowchart illustrating a computer implemented method 1000 of performing non-linear stretch on images. Method 1000 begins at operation 1010 by receiving an image having a first aspect ratio. Operation 1020 performs a nonlinear stretch to both horizontal and vertical aspects of the received image as a function of the second aspect ratio different than the first aspect ratio. The images are displayed at operation 1030 on a display screen having the second aspect ratio.

In one example, performing the nonlinear stretch includes expanding the image in one of the horizontal and vertical directions and compressing the image in the other one of the horizontal and vertical directions.

In a further example, the performing the nonlinear stretch includes comparing the first and second aspect ratios to a table of aspect ratios and selecting parameters from the table for the expanding and compressing.

Method 1000 may also include detecting subtitles in the received image at operation 1040 and determining a black bar size suitable for holding the subtitles. This may be done prior to performing the non-linear stretch at operation 1020. Operation 1030 displays only a minimal black bar area required to fit the subtitles, while using nonlinear stretch to reduce or remove black bar areas do not contain subtitles.

Figure 11:
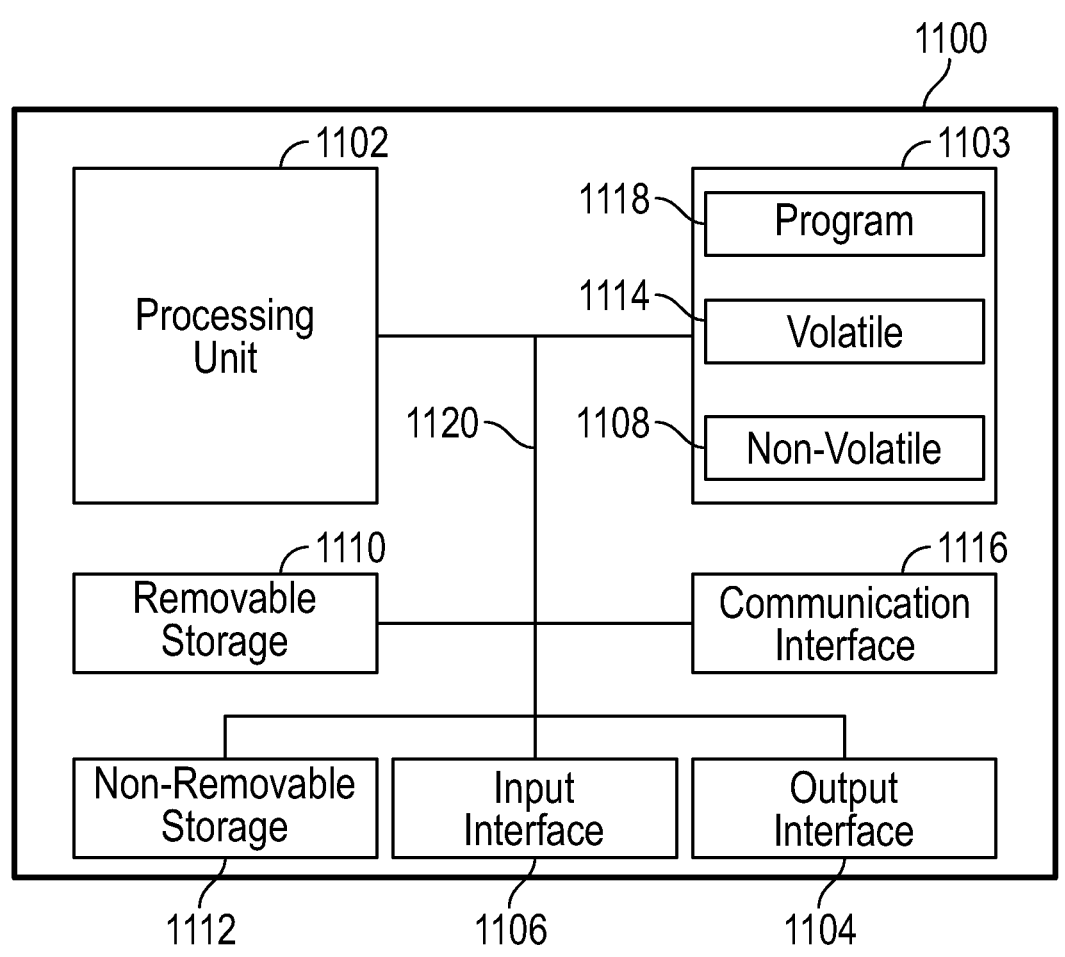
FIG. 11 is a block schematic diagram of a computer system for implementing an improved video processing system and performing methods and algorithms according to an example embodiment.

FIG. 11 is a block schematic diagram of a computer system 1100 1100 to perform bidirectional non-linear stretch on images, generating subtitle areas, and for performing methods and algorithms according to example embodiments. All components need not be used in various embodiments.

One example computing device in the form of a computer 1100 may include a processing unit 1102, memory 1103, removable storage 1110, and non-removable storage 1112. Although the example computing device is illustrated and described as computer 1100, the computing device may be in different forms in different embodiments. For example, the computing device may instead be a smartphone, a tablet, smartwatch, smart storage device (SSD), or other computing device including the same or similar elements as illustrated and described with regard to FIG. 11. Devices, such as smartphones, tablets, and smartwatches, are generally collectively referred to as mobile devices or user equipment.

Although the various data storage elements are illustrated as part of the computer 1100, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 1103 may include volatile memory 1114 and non-volatile memory 1108. Computer 1100 may include—or have access to a computing environment that includes—a variety of computer-readable media, such as volatile memory 1114 and non-volatile memory 1108, removable storage 1110 and non-removable storage 1112. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 1100 may include or have access to a computing environment that includes input interface 1106, output interface 1104, and a communication interface 1116. Output interface 1104 may include a display device, such as a touchscreen, that also may serve as an input device. The input interface 1106 may include one or more of a touchscreen, touchpad, mouse, keyboard, camera, one or more device-specific buttons, one or more sensors integrated within or coupled via wired or wireless data connections to the computer 1100, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 1100 are connected with a system bus 1120.

Computer-readable instructions stored on a computer-readable medium are executable by the processing unit 1102 of the computer 1100, such as a program 1118. The program 1118 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 1118 along with the workspace manager 1122 may be used to cause processing unit 1102 to perform one or more methods or algorithms described herein.

EXAMPLES

1. A computer implemented method includes receiving video images, detecting subtitles in the received video images, and maximizing the size of the displayed image while still leaving room to display the subtitles.

2. A computer implemented method includes receiving video images having a first aspect ratio, displaying the video images on a display screen to optimize the size of the displayed video images, detecting subtitles in the received video images, adding a subtitle area for display of subtitles outside of the display of the video images by reducing the size of the displayed video images.

3. A computer implemented method includes receiving an image having a first aspect ratio, performing a nonlinear stretch to both horizontal and vertical aspects of the received image as a function of the second aspect ratio different than the first aspect ratio, and displaying the images on a display screen having the second aspect ratio.

4. The method of example 3 wherein the nonlinear stretch includes expanding the image in one of the horizontal and vertical directions and compressing the image in the other one of the horizontal and vertical directions.

5. The method of example 4 wherein performing a nonlinear stretch includes comparing the first and second aspect ratios to a table of aspect ratios and selecting parameters from the table for the expanding and compressing.

6. The method of example 3 and further includes detecting subtitles in the received image and displaying only a minimal black bar area required to fit the subtitles, while using nonlinear stretch to reduce or remove black bar areas do not contain subtitles.

7. The method of example 6 wherein the adjustment is dynamic.

8. The method of example 7 and further including discontinuing the adjustment after a configurable amount of time since detecting at least one subtitle.

9 The method of example 3 and further comprising preserving image sharpness per pixel.

10. A machine-readable storage device having instructions for execution by a processor of a machine to cause the processor to perform operations to perform any of the methods of examples 1-9.

11. A device includes a processor and a memory device coupled to the processor and having a program stored thereon for execution by the processor to perform operations to perform any of the methods of examples 1-9.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:
    receiving video images having a first aspect ratio;
    detecting subtitles in the received video images; and
    adding a subtitle area for display of subtitles outside of the display of the video images by modifying a size of the displayed video images, wherein modifying the size of the displayed video images comprises performing a nonlinear stretch to at least one of horizontal or vertical aspects of the received video images to optimize display of the video images on the display device, and wherein video image pixels nearer to an edge than a center of each image are stretched more than pixels nearer to the center than an edge of each image.

2. The method of claim 1 wherein the displayed video images are displayed on a display device having a second aspect ratio different than the first aspect ratio.

3. The method of claim 2 wherein the nonlinear stretch is applied to both horizontal and vertical aspects of the received video images as a function of the first and second aspect ratios.

4. The method of claim 1 wherein the nonlinear stretch comprises:
    expanding the video images in one of the horizontal and vertical directions; and
    compressing the video image in the other one of the horizontal and vertical directions.

5. The method of claim 4 wherein performing a nonlinear stretch comprises:
    comparing the first aspect ratio and a second aspect ratio to a table of aspect ratios; and
    selecting parameters from the table for the expanding and compressing.

6. The method of claim 1 wherein the subtitle area comprises a black bar area having a size that is minimized to fit the detected subtitle while using the nonlinear stretch to reduce or remove black bar areas that do not contain subtitles.

7. The method of claim 6 wherein modifying the size of the displayed video images is dynamic.

8. The method of claim 7 and further comprising removing the subtitle area and after a configurable amount of time since detecting at least one subtitle.

9. A computer implemented method comprising:

receiving an image having a first aspect ratio;

performing a nonlinear stretch to at least one of horizontal or vertical aspects of the received image as a function of a second aspect ratio different than the first aspect ratio, wherein the nonlinear stretch applies a variable scaling ratio that changes continuously across the image such that video image pixels nearer to an edge than a center of each image are stretched more than pixels nearer to a center than an edge of each image; and displaying the images on a display screen having the second aspect ratio.

10. The method of claim 9 wherein the nonlinear stretch comprises:

expanding the image in one of the horizontal and vertical directions; and compressing the image in the other one of the horizontal and vertical directions.

11. The method of claim 10 wherein performing the nonlinear stretch comprises:

comparing the first and second aspect ratios to a table of aspect ratios; and selecting parameters from the table for the expanding and compressing.

12. The method of claim 9 and further comprising:

detecting subtitles in the received image; and displaying only a minimal black bar area required to fit the subtitles, while using nonlinear stretch to reduce or remove black bar areas that do not contain subtitles.

13. The method of claim 12 wherein displaying only a minimal black bar area required to fit the subtitles comprises dynamically modifying a size of the displayed video images.

14. The method of claim 13 and further comprising removing the subtitle area and after a configurable amount of time since detecting at least one subtitle.

15. The method of claim 9 and further comprising preserving image sharpness per pixel.

16. A device comprising:

a processor; and a memory device coupled to the processor and having a program stored thereon for execution by the processor to perform operations to perform a method comprising:

receiving video images having a first aspect ratio;

detecting subtitles in the received video images; and adding a subtitle area for display of subtitles outside of a display of the video images by modifying a size of the displayed video images, wherein modifying the size of the displayed video images comprises performing a nonlinear stretch to at least one of horizontal or vertical aspects of the received video images to optimize display of the video images on a display device, and wherein video image pixels nearer to an edge than a center of each image are stretched more than pixels nearer to the center than an edge of each image.

17. The device of claim 16 wherein the displayed video images are displayed on a display device having a second aspect ratio different than the first aspect ratio.

18. The device of claim 17 wherein modifying the size of the displayed video images comprises performing a nonlinear stretch to both horizontal and vertical aspects of the received video images as a function of the first and second aspect ratios to optimize display of the video images on the display device.

19. The device of claim 17 wherein the nonlinear stretch comprises:

expanding the video images in one of the horizontal and vertical directions; and compressing the video image in the other one of the horizontal and vertical directions.

20. The device of claim 19 wherein performing a nonlinear stretch comprises:

comparing the first and second aspect ratios to a table of aspect ratios; and selecting parameters from the table for the expanding and compressing.

21. The Method of claim 1 wherein modifying the size of the displayed video images comprises linearly resampling to calculate final output pixels.

* * * * *